US007605862B2

(12) United States Patent
Hou

(10) Patent No.: US 7,605,862 B2
(45) Date of Patent: Oct. 20, 2009

(54) APPARATUS FOR A PORTABLE ELECTRONIC DEVICE

(76) Inventor: Chuan-Kung Hou, 4F., No. 13, Yongheng Rd., Yonghe City, Taipei County 234 (TW)

( * ) Notice: Subject to any disclaimer, the term of this patent is extended or adjusted under 35 U.S.C. 154(b) by 636 days.

(21) Appl. No.: 10/759,272

(22) Filed: Jan. 20, 2004

(65) Prior Publication Data

US 2005/0157882 A1 Jul. 21, 2005

(51) Int. Cl.
*H04N 5/225* (2006.01)

(52) U.S. Cl. ........................................................ 348/373

(58) Field of Classification Search ................. 348/373, 348/14.02, 374, 376, 375, 552, 333.06; 381/1, 381/351, 338, 300, 306, 332, 333, 334; 455/575.3, 455/575.1; 379/52
See application file for complete search history.

(56) References Cited

U.S. PATENT DOCUMENTS 4,633,323 A * 12/1986 Haberkern et al. .......... 348/838
5,291,541 A * 3/1994 Gibler et al. .................. 379/52
6,064,746 A * 5/2000 Nakamura et al. .......... 381/351
6,259,794 B1 * 7/2001 Dobbins ..................... 381/124
6,834,744 B2 * 12/2004 Toki ........................... 181/148
6,859,543 B2 * 2/2005 Fingleton .................... 381/338
6,930,725 B1 * 8/2005 Hayashi ...................... 348/373
7,061,520 B2 * 6/2006 Choi ....................... 348/14.02
7,146,200 B2 * 12/2006 Park et al. ................ 455/575.3
7,190,968 B2 * 3/2007 Nakamura ............... 455/550.1
7,259,793 B2 * 8/2007 Manico et al. .............. 348/373
7,269,442 B2 * 9/2007 Sato et al. ................ 455/556.1
2002/0158987 A1 * 10/2002 Shimizu ...................... 348/364
2003/0064685 A1 * 4/2003 Kim ............................ 455/90
2004/0023684 A1 * 2/2004 Sato et al. ................ 455/550.1
2004/0097258 A1 * 5/2004 Lee et al. ................. 455/550.1

* cited by examiner

*Primary Examiner*—Tuan V Ho
*Assistant Examiner*—Kent Wang
(74) *Attorney, Agent, or Firm*—Perkins Coie LLP

(57) ABSTRACT

A video/audio combo device includes a picture-taking element for taking pictures and a sound-generating element to output sound. It has a housing shell located in a portable electronic data processing device with the picture taking element and the sound-generating element jointly housed in the housing shell. While the picture-taking element can take pictures, the housing shell has a remained space to serve as a resonant space to enable the sound-generating element to achieve an improved audio output effect.

13 Claims, 7 Drawing Sheets

APPARATUS FOR A PORTABLE ELECTRONIC DEVICE

FIELD OF THE INVENTION

The present invention relates to a video/audio combo device adopted for using on portable electronic data processing devices such as a personal digital assistant (PDA), handheld computer, notebook computer, mobile phone and the like to provide picture taking and audio outputting functions.

BACKGROUND OF THE INVENTION

Personal electronic data processing devices such as a PDA, handheld computer, notebook computer, and mobile phone mainly aim to enable users to process electronic messages anytime anywhere. In recent years, with fast developments of the wireless communication environments, these portable electronic devices have gradually the concept of 'mobile office' realized.

The portable electronic data processing devices mainly focus on two aspects: first, slim and light; second, powerful function in a small size. The slim and light aim to make carrying easy. The powerful function aims to provide sufficient functions at users' disposable without limiting their work. At present, most portable electronic data processing devices already meet the requirements 'slim and light', and 'powerful function'. However, with growing developments of multimedia technologies, many portable electronic data processing devices also try to provide multimedia applications, such as installing a sound generating element on the portable electronic data processing device, to generate a corresponding sound while processing multimedia files. Or installing a picture taking element (such as CCD or CMOS) on the portable electronic data processing device to enable users to take pictures anywhere anytime and store the pictures in the portable electronic data processing device.

Take the mobile phone for instance, the conventional simple buzz cannot meet user's requirements anymore. These days, many mobile phone producers have developed application software that can broadcast musical buzz or songs. The sound generating element generally is a Mylar speaker bonding closely to one side of the case. As the case does not have resonant space, the Mylar speaker cannot produce desirable audio quality even if it can broadcast musical buzz or songs.

Moreover, in the past most picture taking elements were fixedly located on the portable electronic data processing devices such as mobile phones, PDAs, or notebook computers. They were not convenient. Now Sony has introduced a PDA model PG-NX80V/G and a notebook computer model PCG-TR2T that have a rotary video lens to enable users to rotate the video lens as desired to take pictures. However, the rotary video lens takes a lot of space.

SUMMARY OF THE INVENTION

In view of the aforesaid disadvantages occurred to the portable data processing device, such as the Mylar speaker cannot generate musical buzz or songs with a desirable audio quality due to no resonant space caused by size limitation of the portable data processing device, and the trend of making the rotary video lens a standard feature on the portable data processing device, the present invention takes into account multimedia applications to provide a video/audio combo device that uses the rotary video lens to provide a resonant space for the Mylar speaker.

The video/audio combo device according to the invention mainly includes a housing shell, a picture taking element and at least one sound-generating element. The housing shell is located on a portable electronic data processing device that has a viewfinder window and a sound exit port. The picture-taking element and the sound-generating element are jointly housed in the housing shell corresponding respectively to the viewfinder window and sound exit port. The picture-taking element can be used to take pictures and record the pictures in the portable electronic data processing device. When the portable electronic data processing device processes multimedia files, it can generate a corresponding sound through the sound-generating element. As the housing shell has an interior space that functions as a resonant space for the sound-generating element, an improved audio output can be achieved.

In one aspect, the video/audio combo device according to the invention has a picture taking element and a sound-generating element housed in the housing shell together, to utilize the space of the housing shell more effectively. Meanwhile, the space in the portable electronic data processing device that was originally occupied by a sound-generating element may be freed for other use. Hence designers and producers of the portable electronic data processing device can better use the space to make the whole device even slimmer and lighter. And the resonant space for the sound-generating element can provide an optimal audio output effect for multimedia applications.

The foregoing, as well as additional objects, features and advantages of the invention will be more readily apparent from the following detailed description, which proceeds with reference to the accompanying drawings.

DESCRIPTION OF THE PREFERRED EMBODIMENTS

The video/audio combo device according to the invention is adopted for use on a portable electronic data processing device such as a PDA, handheld computer, notebook computer, mobile phone and the like that is a personal electronic data processing device easy to carry.

Figure 1:
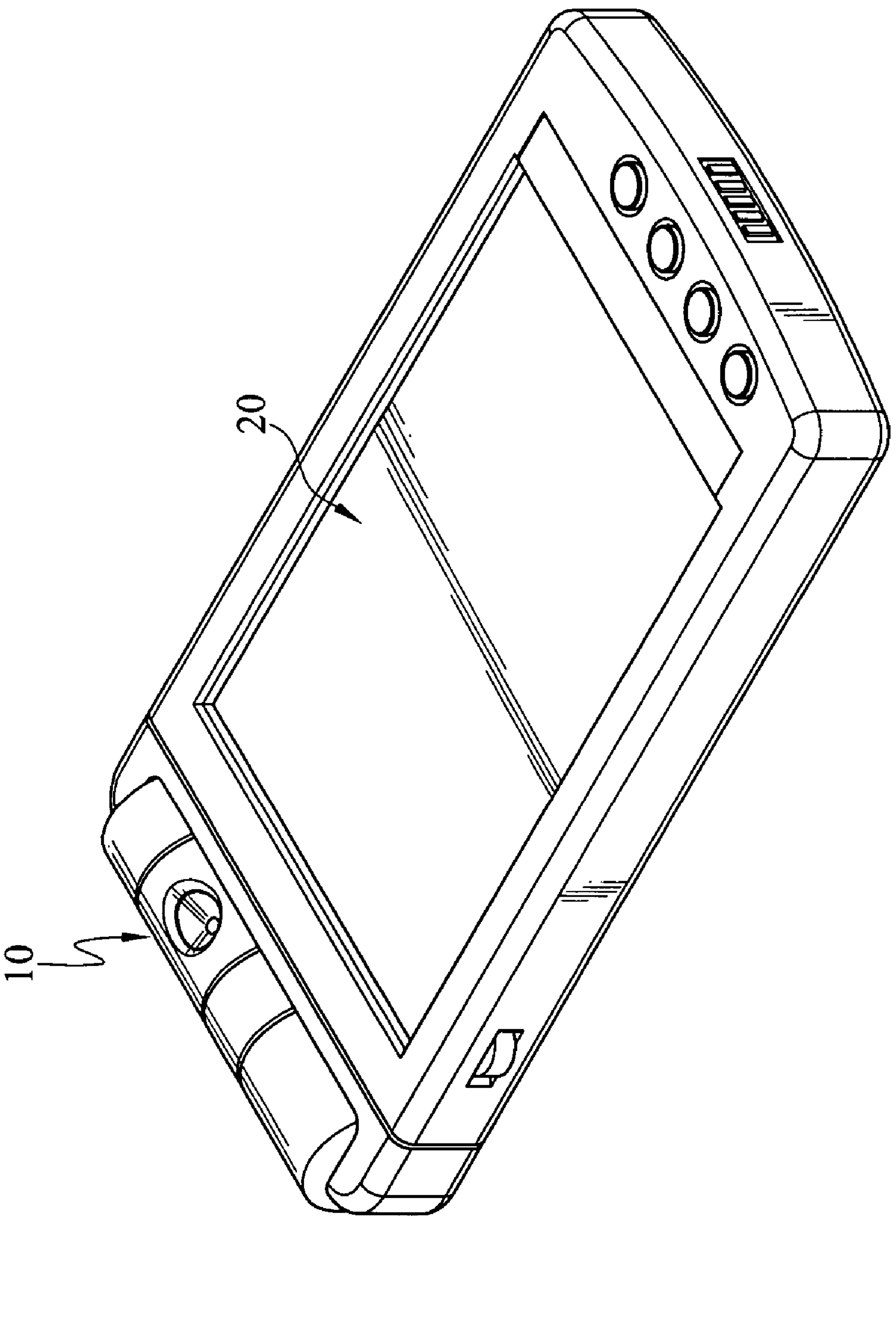
FIG. 1 is a schematic view of the invention adopted for use on a PDA.

Refer to FIG. 1 for an example of the invention adopted for use on a portable electronic data processing device. The video/audio combo device 10 according to the invention is installed on a portable electronic data processing device 20 (a PDA is illustrated in the drawing). The video/audio combo device 10 may be fixedly installed on the portable electronic data processing device 20 and users can turn the portable electronic data processing device 20 to take pictures. The video/audio combo device 10 may also be installed on the portable electronic data processing device 20 in a rotary manner to enable users to turn the video/audio combo device 10 to take pictures. The following embodiments are based on the rotary video/audio combo device 10.

Figure 2:
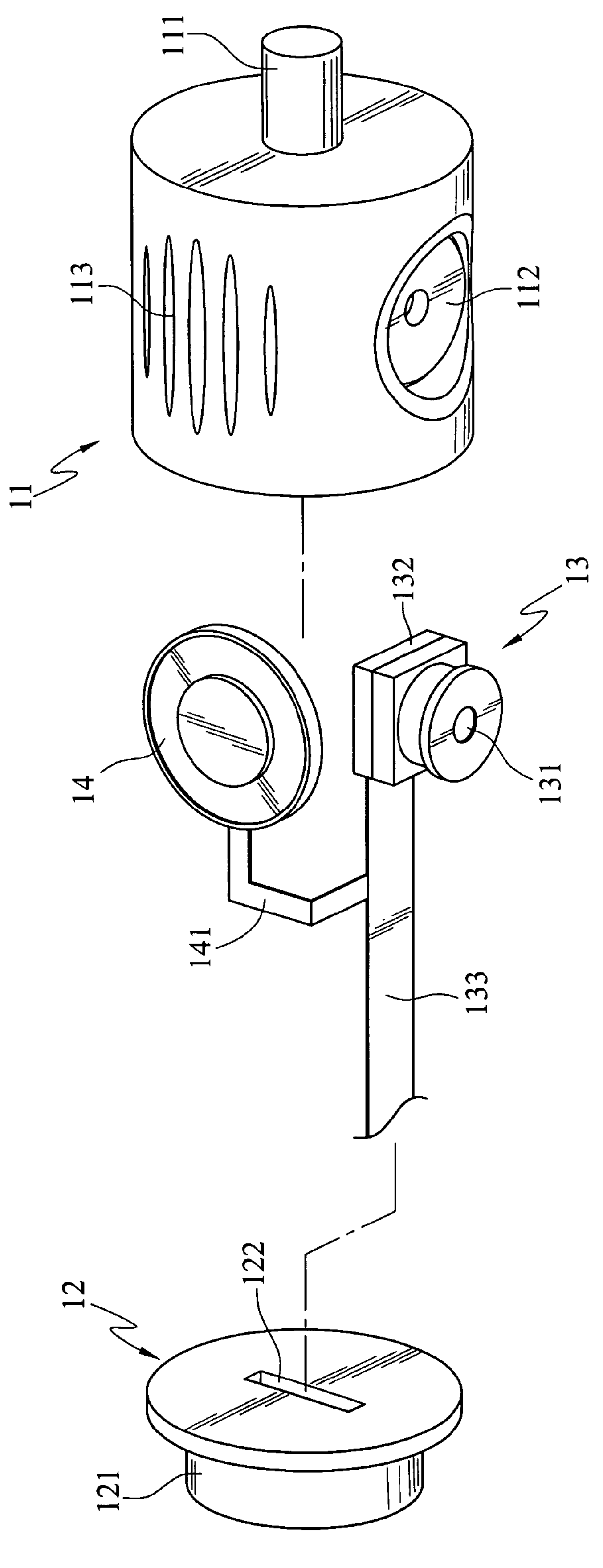
FIGS. 2, 3 and 4 are schematic views of a first embodiment of the invention.
Figure 3:
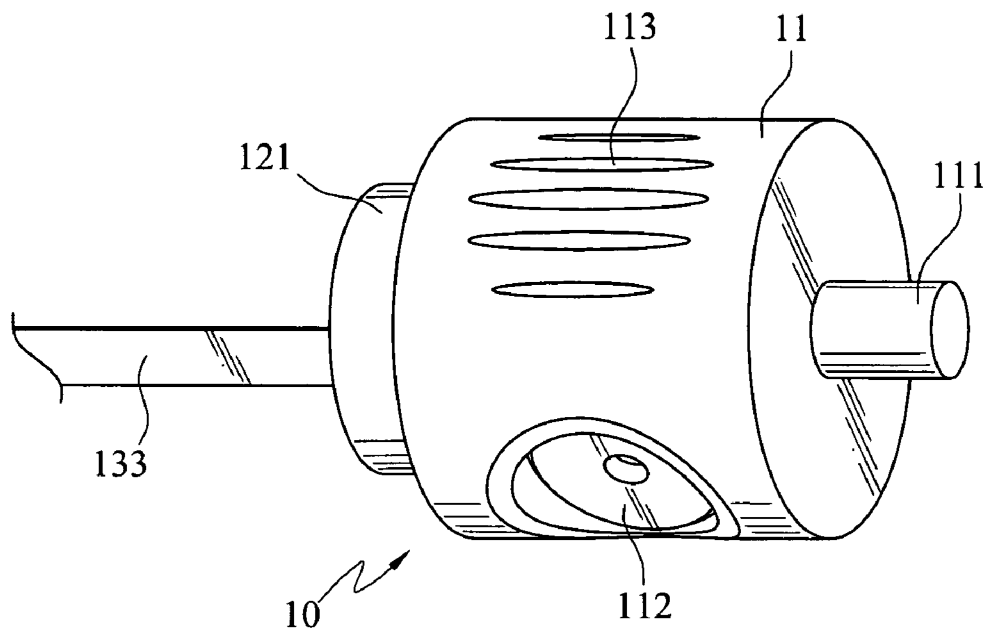
Figure 4:
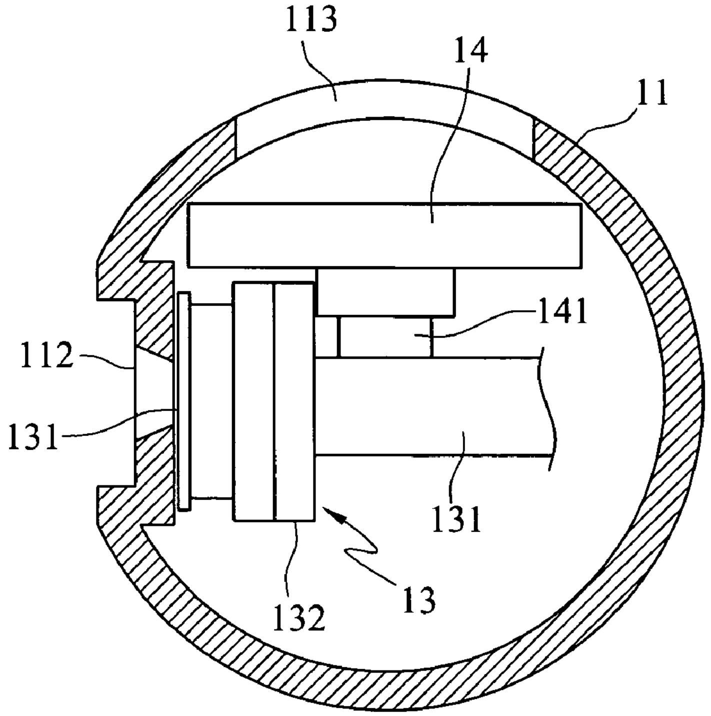

Refer to FIGS. 2, 3 and 4 for a first embodiment of the invention. The video/audio combo device 10 includes a housing shell 11, a cap 12, a picture-taking element 13 and a sound-generating element 14.

The housing shell 11 is substantially a hollow cylindrical member which has one end closed and sealed and another end opened. The closed end is extended in the center to have an axle 111 formed thereon to couple on a portable electronic data processing device 20 (the coupling method is not shown in the drawings) to serve as the axis of one end of the housing shell 11. The perimeter surface of the housing shell 11 has a viewfinder window 112 and an audio exit port 113. The cap 12 mates the shape of the housing shell 11 and may be coupled on the opened end thereof The cap 12 has another end extending to have a cap axle 121 formed thereon, which is coupled on the portable electronic data processing device 20 (the coupling method is not shown in the drawings) to serve as the axis of another end of the housing shell 11 so that the cap 12 is coupled on the housing shell IL The axle 111 and the cap axle 121 are coupled on the portable electronic data processing device 20 in a turning manner. The cap 12 further has a wire outlet 122.

The picture-taking element 13 is a picture-taking device, which includes a lens 131 and a photosensitive element 132. The photosensitive element 132 may be a charge-coupled device (CCD) or a complementary metal-oxide semiconductor (CMOS) for recording light variation to generate image signals. The picture-taking element 13 is housed in the housing shell 11 with the lens 131 corresponding to the viewfinder window 112. The picture-taking element 13 further has a connection line 133 connecting to the photosensitive element 132. The connection line 133 may be a flexible print circuit (FPC) or a cable, passing through the wire outlet 122 of the cap 12, to connect to a circuit (not shown in the drawings) of the portable electronic data processing device 20, for signal transmission.

The sound-generating element 14 is a Mylar speaker for receiving signals to generate sound. It is housed in the housing shell 11 and corresponds to the audio exit port 113. It also has a connection line 141 connecting to the connection line 133 to electrically connect to the portable electronic data processing device 20 to receive audio signals from the portable electronic data processing device 20 and generate sound.

Referring to FIG. 4, the housing shell 11 contains the picture-taking element 13 and the sound-generating element 14. The interior space of the housing shell 11, after deducting the space occupied by the picture-taking element 13, has a remained space which may serve as a resonant space of the sound generating element. Thus the sound-generating element 14 may achieve an optimal audio output effect.

Figure 5A:
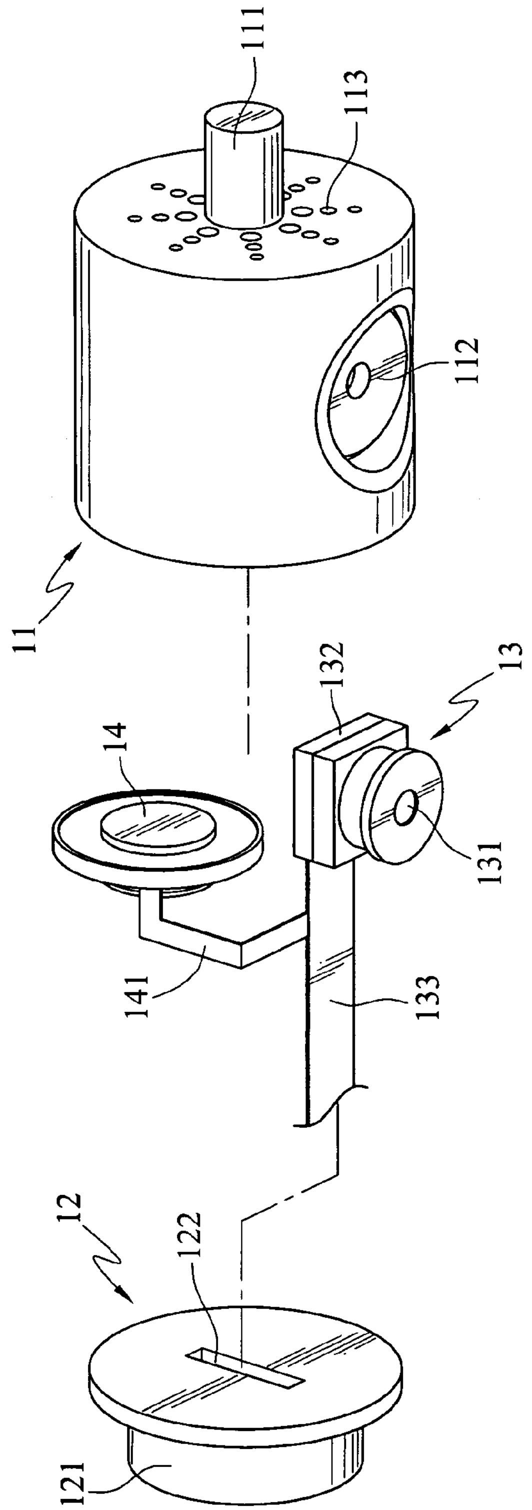
FIGS. 5A and 5B are schematic views of a second embodiment of the invention.
Figure 5B:
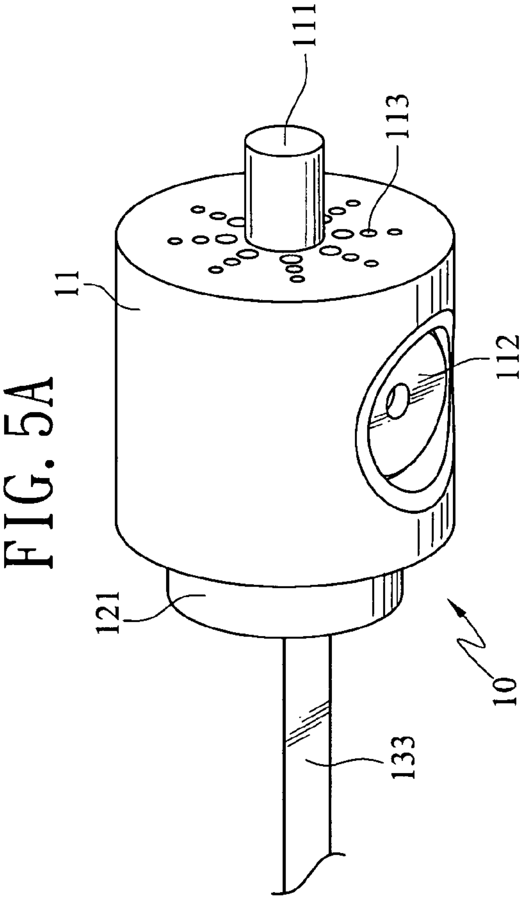

Refer to FIGS. 5A and 5B for a second embodiment of the invention. In this embodiment, the audio exit port 113 is located on the closed end of the housing shell 11. It may be adopted on different types of the portable electronic data processing device 20.

Figure 6A:
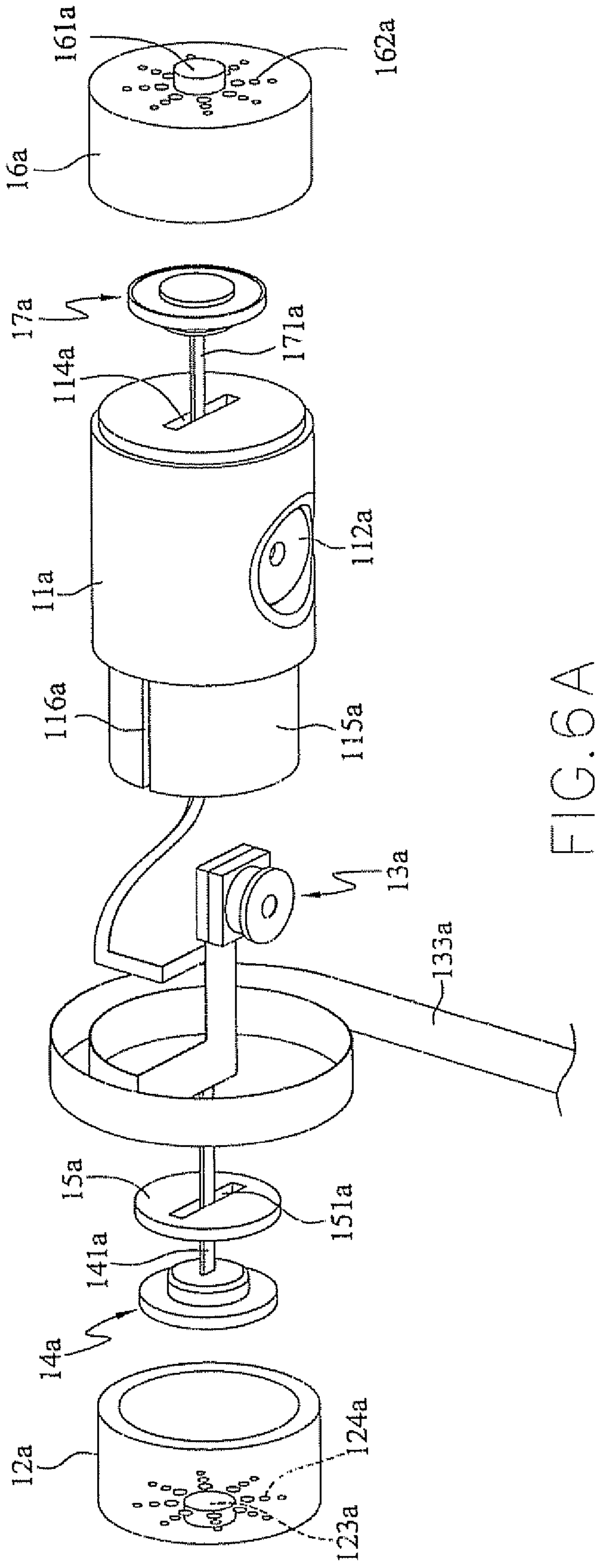
FIGS. 6A, 6B and 6C are schematic views of a third embodiment of the invention.
Figure 6B:
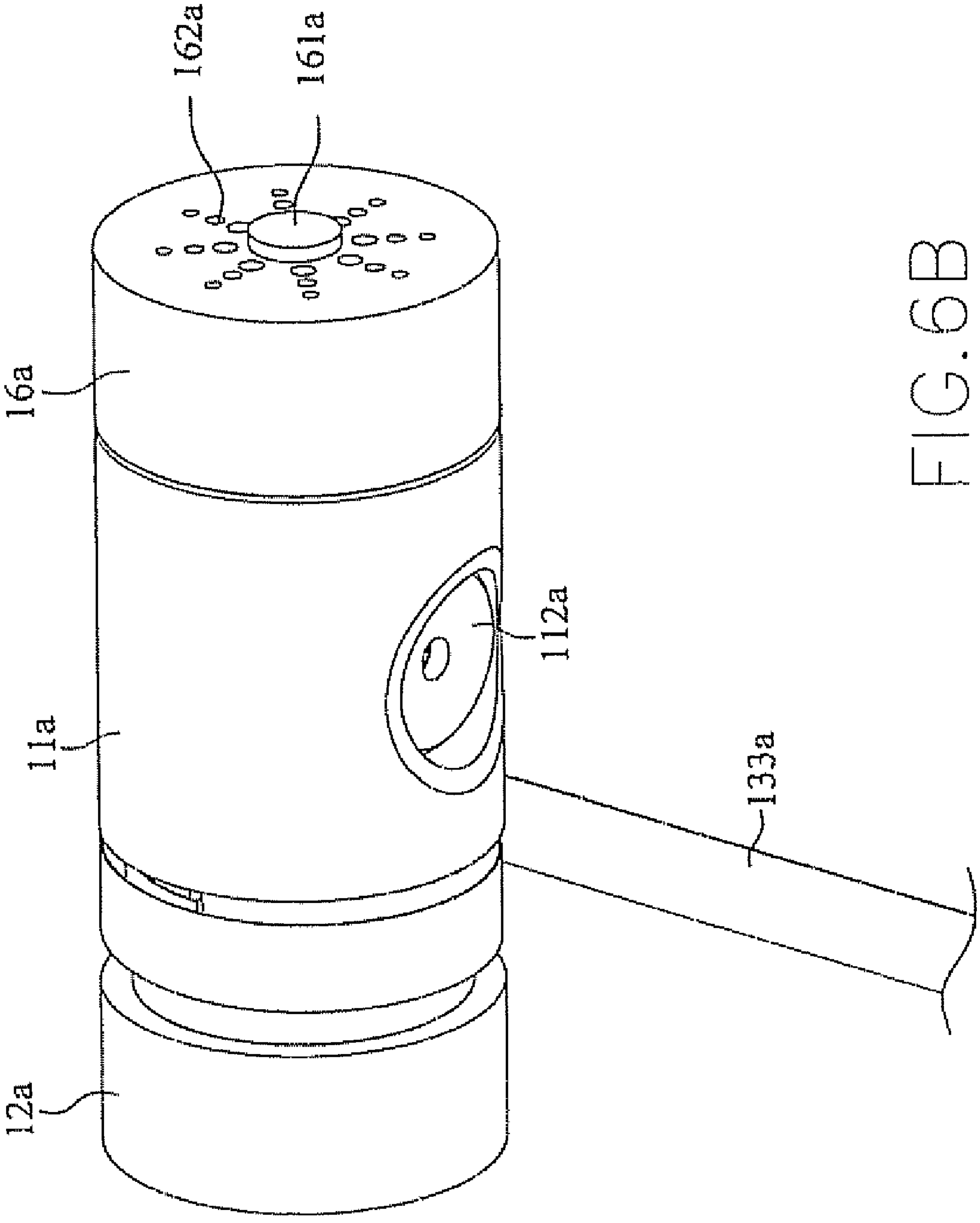
Figure 6C:
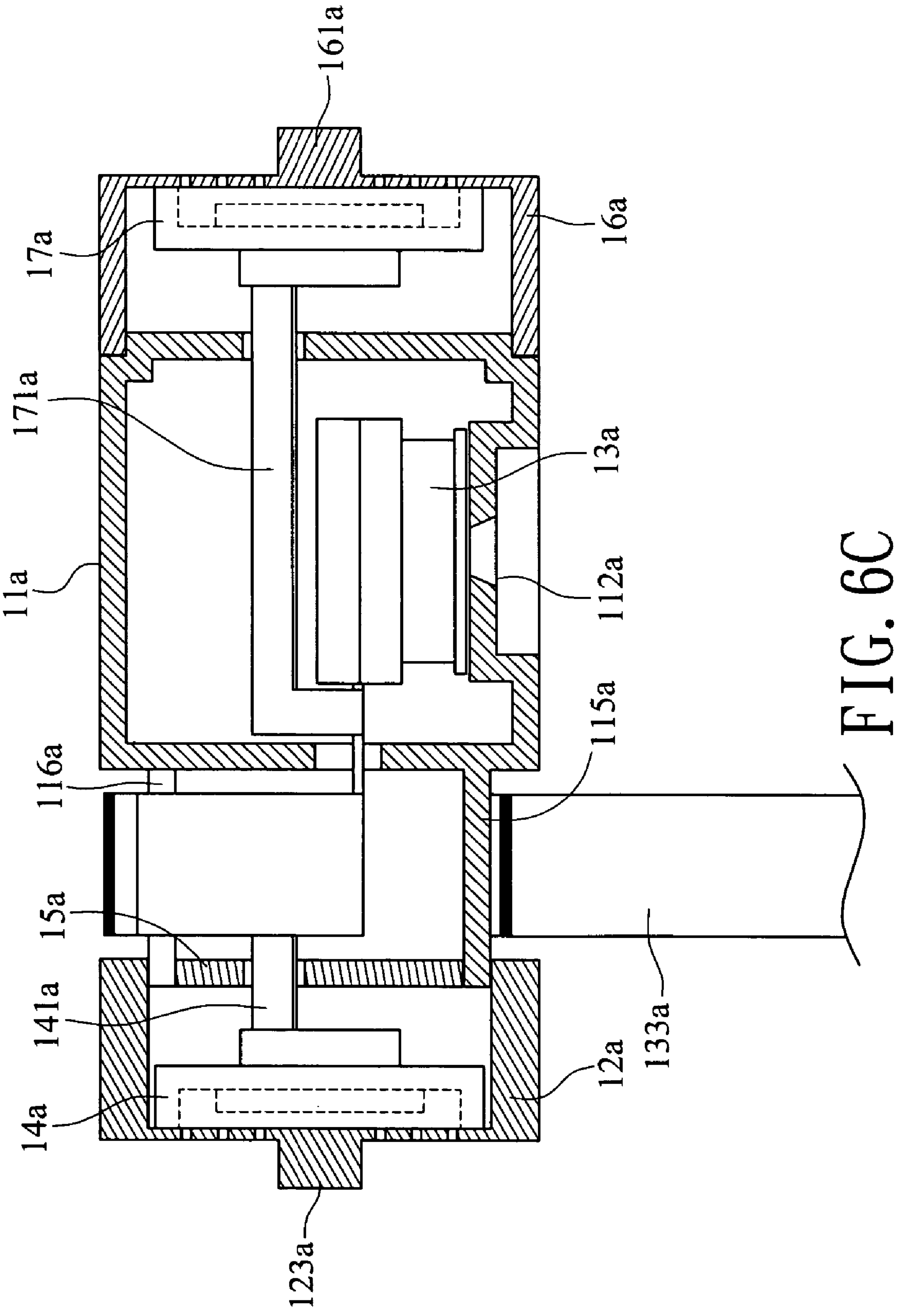

Refer to FIGS. 6A, 6B and 6C for a third embodiment of the invention. It is a double sound track video/audio combo device 10*a*. The housing shell 11*a* is substantially a hollow cylindrical member, which has one end closed and another end opened. The closed end has a wire outlet 114*a*. The opened end is extended axially to form an extension 115*a*, which has a wire exit trough 116*a*. The housing shell 11*a* further has a viewfinder window 112*a*. A picture-taking element 13*a* is housed in the housing shell 11*a* corresponding to the viewfinder window 112*a*. The picture taking element 13*a* has a connection line 133*a*, extending through the extension 115*a* and winding the extension 115*a* for a number of times to connect to a portable electronic data processing device 20, so that the connection line 133*a* does not interrupt turning of the housing shell 11*a*. The opened end of the extension 115*a* is coupled with a spacer 15*a*, which has a wire outlet 151*a*. A first cap 12*a* and a second cap 16*a* are provided to mate the hollow shell 11*a*. The first cap 12*a* and the second cap 16*a* are hollow barrels that have one end closed and other end opened. The opened ends of the first cap 12*a* and the second cap 16*a* are coupled respectively on the extension 115*a* and the closed end of the housing shell 11*a*. The closed ends of the first cap 12*a* and the second cap 16*a* have respectively an axle 123*a* and 161*a* formed thereon, and an audio exit port 124*a* and 162*a*. The axles 123*a* and 161*a* are coupled on the portable electronic data processing device 20 so that the housing shell 11*a* is turning on the portable electronic data processing device 20. There are a first sound-generating element 14*a* and a second sound generating element 17*a* located respectively in the first cap 12*a* and the second cap 16*a* corresponding to the audio exit ports 124*a* and 162*a*. The first sound-generating element 14*a* and the second sound generating element 17*a* have respectively a connection line 141*a* and 171*a*, running through the wire outlets 151*a* and 114*a* to electrically connect to the connection line 133*a*, to receive audio signals from the portable electronic data processing device 20.

Referring to FIG. 6C, in the third embodiment of the invention, the first sound-generating element 14*a* and the second sound generating element 17*a* are located respectively in the first cap 12*a* and the second cap 16*a*, and are located on the left side and the right side of the housing shell 11*a*. The first cap 12*a* and the second cap 16*a* serve as the resonant chests of the first sound generating element 14*a* and the second sound generating element 17*a*. Thereby, an optimal two sound tracks audio output effect may be achieved.

While the preferred embodiments of the invention have been set forth for the purpose of disclosure, modifications of the disclosed embodiments of the invention as well as other embodiments thereof may occur to those skilled in the art. For instance, while the rotary housing shell has been adopted in the disclosed embodiments, the stationary housing shell may also be adopted. Accordingly, the appended claims are intended to cover all embodiments, which do not depart from the spirit and scope of the invention.

What is claimed is:

1. An apparatus for use with a portable electronic device, the apparatus comprising:

a housing having a generally circular cross-section, an open end, a closed end, exterior walls defining an exterior surface, an audio port in the exterior surface, a viewfinder window in the exterior surface, and interior walls defining a generally hollow interior portion;

a sound-generating element within the generally hollow interior portion and proximate to the at least one audio port, wherein the sound-generating element is configured to receive audio signals from the portable electronic device and generate sounds corresponding to the audio signals;

a picture-taking element within the generally hollow interior portion and proximate to the viewfinder window, wherein the picture-taking element is configured to capture images and generate image signals corresponding to the captured images for transmission to the portable electronic device; and a cap covering the open end of the housing, wherein the cap and the housing enclose the sound-generating element and the picture-taking element, and wherein the generally hollow interior portion is positioned as a resonant space for sounds generated by the sound-generating element, wherein the closed end has a first surface with a first axle formed thereon and the cap has a second surface facing away from the first surface with a second axle formed thereon, wherein the first axle has a first end and the second axle has a second end, and wherein the first and second ends are configured to be operably coupled to the portable electronic device, and further wherein the apparatus is rotatably movable about the first and second axles relative to the portable electronic device.

2. The apparatus of claim 1 wherein the at least one audio port is at a portion of the exterior surface corresponding to the closed end.

3. The apparatus of claim 1 wherein the picture-taking element includes one of a Charge Coupled Device (CCD) and a Complementary Metal-Oxide Semiconductor (CMOS).

4. The apparatus of claim 1 wherein the sound-generating element includes a Mylar speaker.

5. An apparatus for use with a portable electronic device, the apparatus comprising:

a body comprising an exterior surface, a first end, and a second end opposite the first end, wherein the first end and the second end are configured to be electrically coupled to the portable electronic device, and the body has an interior region formed therein, wherein the exterior surface has at least one audio port and an opening formed therein;

at least one sound-generating element in the interior region and proximate to the at least one audio port, wherein the at least one sound-generating element is configured to be electrically coupled to the portable electronic device; and at least one image-capturing element in the interior region and proximate to the opening, wherein the at least one image-capturing element is configured to be electrically coupled to the portable electronic device, wherein the body encloses the at least one sound-generating element and the at least one image-capturing element, and the interior region of the body is a resonant space for sound generated by the at least one sound-generating element, wherein the first end and second end are configured to positionally and rotatably fix the apparatus.

6. The apparatus of claim 5 wherein the body includes:

a first portion having the interior region formed therein; and a second portion configured to be coupled to the first portion, wherein the first portion and the second portion form the interior region.

7. An apparatus for use with a portable electronic device, the apparatus comprising:

a housing comprising exterior walls defining an exterior surface, a first set of interior walls defining a first chamber, a second set of interior walls defining a second chamber, a first end, and a second end opposite the first end, wherein the first end and the second end are configured to be electrically coupled to the portable electronic device, and the exterior surface has a first audio port, a second audio port, and an opening formed therein;

a first sound-generating element in the first chamber and positioned toward the first audio port, wherein the first sound-generating element is configured to be electrically coupled to the portable electronic device;

a second sound-generating element in the second chamber and positioned toward the second audio port, wherein the second sound-generating element is configured to be electrically connected to the portable electronic device; and an image-capturing element positioned toward the opening, wherein the image-capturing element is configured to be electrically coupled to the portable electronic device, wherein the first chamber substantially encloses the first sound-generating element and forms a first resonant space for first sounds generated by the first sound-generating element, and the second chamber substantially encloses the second sound-generating element and forms a second resonant space for second sounds generated by the second sound-generating element, wherein the first end and the second end are configured to positionally and rotationally fix the housing with the portable electronic device.

8. An apparatus comprising:

means for generating sound configured to be electrically coupled to a portable electronic device;

means for capturing images configured to be electrically coupled to the portable electronic device;

means for housing the means for generating sound and the means for capturing images and for resonating sound generated by the means for generating sound wherein the means for housing comprises a first end and a second end opposite the first end, wherein the first end and the second end are configured to be electrically coupled to the portable electronic device; and means for positionally and rotationally fixing the apparatus within the portable electronic device via the first end and the second end.

9. A portable electronic device, comprising:

a housing comprising exterior walls defining an exterior surface, a first audio port in the exterior surface, a second audio port in the exterior surface, an opening in the exterior surface, a first set of interior walls defining a first chamber, and a second set of interior walls defining a second chamber, wherein the housing has a generally cylindrical shape having a first closed end and a second closed end;

a first axle at a first surface of the first closed end, wherein the first axle has a first end;

a second axle at a second surface of the second closed end, wherein the second surface opposes the first surface, and wherein the second axle has a second end;

a first sound-generating element in the first chamber and positioned toward the first audio port, wherein the first sound-generating element is configured to be electrically connected to the portable electronic device;

a second sound-generating element in the second chamber and positioned toward the second audio port, wherein the second sound-generating element is configured to be electrically connected to the portable electronic device; and an image-capturing element positioned toward the opening, wherein the image-capturing element is configured to be electrically connected to the portable electronic device, wherein the first and second ends are configured to be operably coupled to the portable electronic device.

10. The portable electronic device of claim 9 wherein the opening is a first opening, the housing further comprises a second opening formed therein, and wherein the portable electronic device further comprises:

an electrical connector coupled to the image-capturing element, wherein the electrical connector passes through the second opening and extends at least partially around the exterior surface so as to enable rotation of the apparatus in the portable electronic device.

11. The portable electronic device of claim 10 wherein the electrical connector is coupled to the first sound-generating element and the second sound-generating element.

12. The portable electronic device of claim 9, wherein the housing comprises:

a first portion;

a first generally concave portion configured to be attached to the first portion to form at least one of the interior walls of the first set that defines the first chamber; and a second generally concave portion configured to be attached to the first portion to form at least one of the interior walls of the second set that defines the second chamber.

13. The portable electronic device of claim 12 wherein the first audio port is located in a first portion of the exterior surface corresponding to the first generally concave portion and the second audio port is located in a second portion of the exterior surface corresponding to the second generally concave portion.

* * * * *

UNITED STATES PATENT AND TRADEMARK OFFICE
CERTIFICATE OF CORRECTION

PATENT NO. : 7,605,862 B2
APPLICATION NO. : 10/759272
DATED : October 20, 2009
INVENTOR(S) : Chuan-Kung Hou It is certified that error appears in the above-identified patent and that said Letters Patent is hereby corrected as shown below:

On the cover page,

[*] Notice: Subject to any disclaimer, the term of this patent is extended or adjusted under 35 USC 154(b) by (636) days Delete the phrase "by 636 days" and insert -- by 950 days --

Signed and Sealed this

Fourth Day of May, 2010

David J. Kappos
*Director of the United States Patent and Trademark Office*

UNITED STATES PATENT AND TRADEMARK OFFICE

CERTIFICATE OF CORRECTION

PATENT NO. : 7,605,862 B2
APPLICATION NO. : 10/759272
DATED : October 20, 2009
INVENTOR(S) : Chuan-Kung Hou It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1264 days.

Signed and Sealed this

Fifth Day of October, 2010

David J. Kappos
*Director of the United States Patent and Trademark Office*